United States Patent
Doversberger

[11] 3,835,965
[45] Sept. 17, 1974

[54] FRICTION-TYPE BRAKE ADJUSTMENT DEVICE
[75] Inventor: Richard A. Doversberger, Peoria, Ill.
[73] Assignee: Westinghouse Air Brake Company, Peoria, Ill.
[22] Filed: Feb. 20, 1973
[21] Appl. No.: 333,583

[52] U.S. Cl. .................... 188/79.5 GT, 188/196 P
[51] Int. Cl. ............................................ F16d 65/54
[58] Field of Search .. 188/79.5 M, 79.5 P, 79.5 GT, 188/196 P

[56] References Cited
UNITED STATES PATENTS
| | | | |
|---|---|---|---|
| 1,939,584 | 12/1933 | White | 188/196 P X |
| 2,976,958 | 3/1961 | Scholl | 188/196 P X |
| 3,195,689 | 7/1965 | Ryskamp | 188/79.5 GT |

FOREIGN PATENTS OR APPLICATIONS
| | | | |
|---|---|---|---|
| 118,425 | 10/1942 | Australia | 188/79.5 GT |

Primary Examiner—Duane A. Reger
Attorney, Agent, or Firm—Robert J. Eck; Frank E. Stevens

[57] ABSTRACT

A friction-type brake adjustment device for maintaining a brake shoe in predetermined spacial relationship with a brake drum incorporating: a substantially U-shaped bracket for receiving the brake shoe web having a slot therein: and a stop member received within said slot and carried by and frictionally engaged with said bracket. Sets of guide bars outline the side edges of said slot, one set engages the stop member for urging same toward the brake drum in direct proportion to the wear of the brake lining, and the other set engages the stop member for preventing the return of said brake shoe to its original position.

11 Claims, 6 Drawing Figures

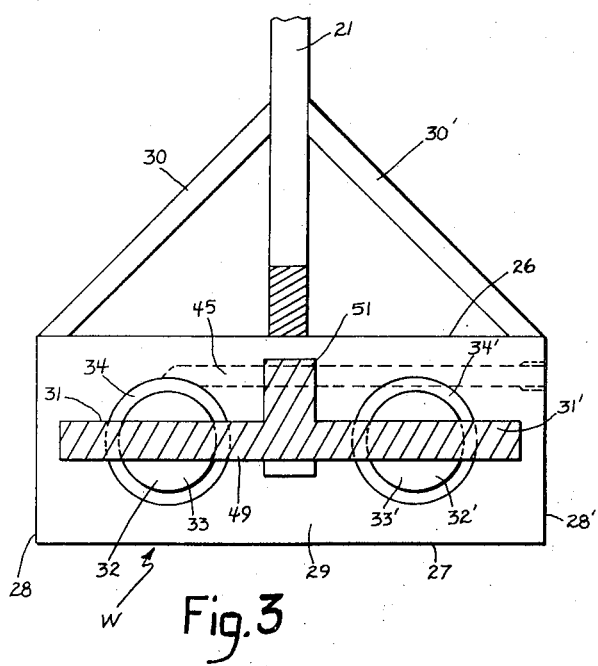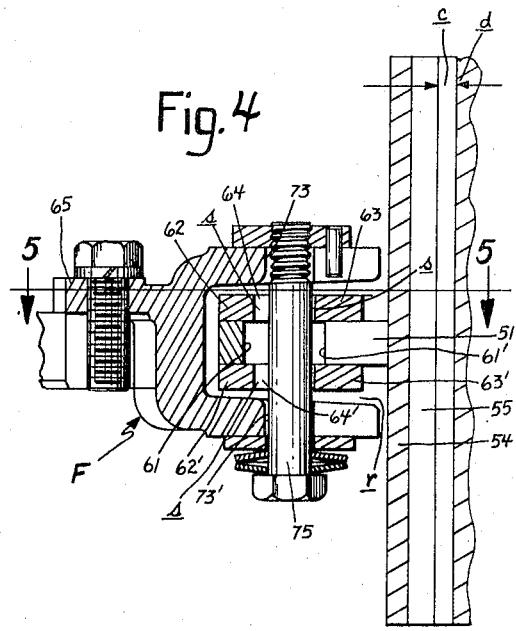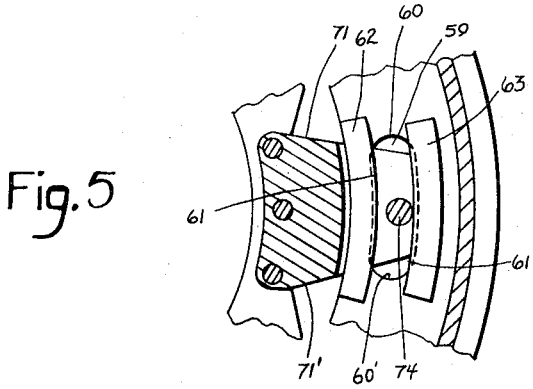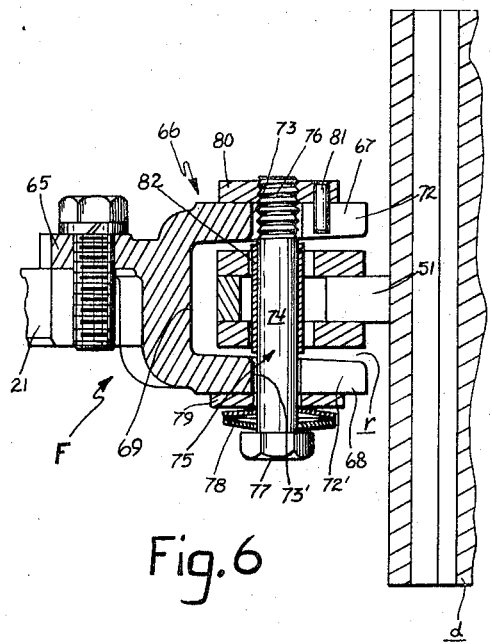

FRICTION-TYPE BRAKE ADJUSTMENT DEVICE

BACKGROUND AND SUMMARY OF THE INVENTION

The present invention relates in general to vehicle service brakes and, more particularly, to a friction-type brake adjustment device therefor.

Generally, vehicles incorporate service brake assemblies having limited brake fluid capacity so that clearance between the brake drum and the brake lining must be maintained relatively static. Prior art devices have failed to maintain relatively constant clearance apart from frequent adjustment with the attendant inconvenience and expense.

The prior art expedients for adjusting the vehicle service brakes utilized extremely sensitive, finely threaded elements adjustable only through special tools such as ratchets, threads, cables or the like. The relative sensitivity of these devices demanded frequent adjustment and necessitated withdrawal of the vehicle from service, thereby contributing to relatively high maintenance cost over the life of the vehicle brakes. The maintenance expense and the "break-down" time tempted management to adjust the vehicle brakes less frequently than adviseable, thus developing a dangerous condition in the field.

By the present invention, the service brakes are automatically adjusted maintaining a predetermined clearance at all times between the brake drum and the lining of the brake shoe. The sensitive brake adjusting elements are substituted by a stop member which passes through a slot in the brake shoe web and is frictionally engaged to a bracket having a recess for receiving the web. The stop member is moved toward the brake drum in direct proportion to the wear of the brake lining when the brakes are applied and maintains the brake shoe in predetermined spacial relationship with the brake drum when the brakes are removed. Accordingly, by the present invention the brake shoe is continuously adjusted in proportion to the wear of the brake lining without requiring withdrawing the vehicle from service for the lifetime of the brake lining. Thus, the efficiency of the vehicle incorporating the present invention is increased and the cost of servicing same is substantially reduced.

The brake adjustment device of the present invention is relatively simple in construction and adapted for ready installation within existing service brake structures. Although simple in construction, it constitutes a positive improvement over the inefficient prior art devices.

BRIEF DESCRIPTION OF THE DRAWINGS

FIG. 3 is a vertical section taken on the line 3—3 of FIG. 1.

FIG. 4 is a horizontal section taken on the line 4—4 of FIG. 1 illustrating the brake in released condition.

FIG. 5 is a horizontal section taken on line 5—5 of FIG. 4.

FIG. 6 is a horizontal section taken substantially on the line 4—4 of FIG. 1 illustrating the brake in applied condition.

DESCRIPTION OF THE PREFERRED EMBODIMENT

Figure 1:
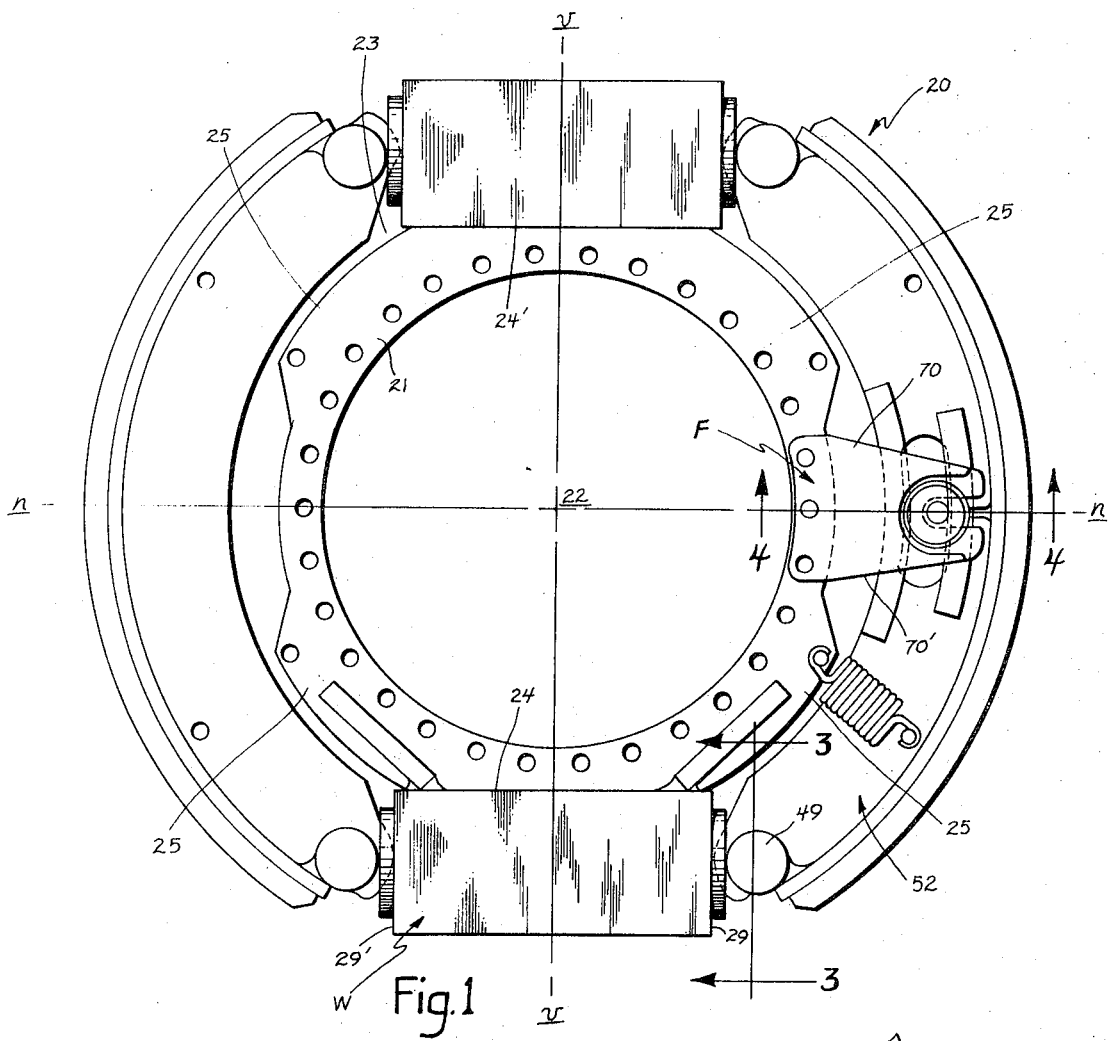
FIG. 1 is a front view of a service brake illustrating a friction-type brake adjuster constructed in accordance with and embodying the present invention.

Referring now to the drawings wherein like reference characters designate like corresponding parts, there is shown in FIG. 1 a service brake assembly 20 comprising a spider plate 21 which is suitably fixed by supporting structure (not shown) to a vehicle circumferentially of the vehicle axle (not shown) in the usual manner. Said spider plate 21 is of general annular configuration having an enlarged central opening 22 and an outer periphery 23 of varying radii for developing: flat portions 24, 24', in its lower and upper regions; and a plurality of lugs or reinforced portions 25 projecting outwardly of the outer periphery 23 at predetermined spaced locations. The lugs 25 are positioned approximately one half the curvelinear distance between the vertical axis $v$—$v$ and the horizontal axis $h$—$h$, or approximately 22½° to 67½° in each quadrant defined by said axes.

Figure 2:
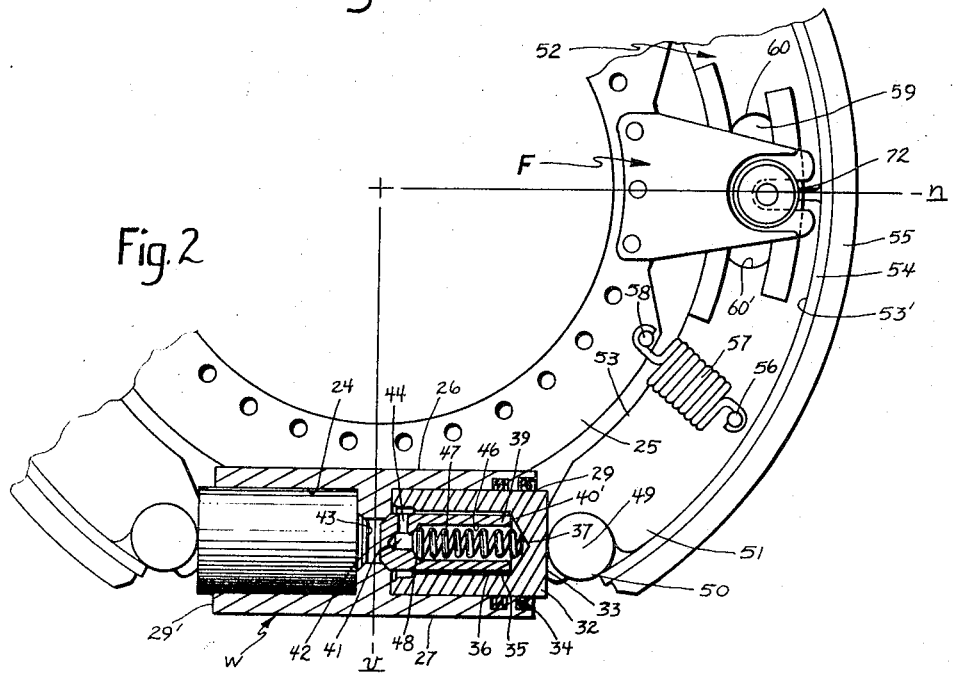
FIG. 2 is a fragmentary front view of the service brake with a vertical section being taken through the cylinder block shown in FIG. 1.

The brake assembly 20 is symetrical about both its vertical axis $v$—$v$ and its horizontal $h$—$h$ so the description of the preferred embodiment will be restricted to the lower right hand quadrant, as illustrated in FIG. 2; it being understood that the structure on each side of the respective axes $v$—$v$ and $h$—$h$ is identical in all respects to the corresponding structure on the other side thereof. For purposes of the present description, the terms "inwardly" and "outwardly" will designate direction and position relative to the vertical axis $v$—$v$ and the terms "upwardly" and "downwardly" will designate direction and position relative to the horizontal axis $h$—$h$.

Fixed to the flattened portion 24 is the top wall 26 of a wheel cylinder block W having a bottom wall 27, side walls 28, 28' (FIG. 3) and end walls 29, 29'. The wheel cylinder block W is supported by a pair of gussets 30, 30' connecting the spider plate 21 to the top wall 26 adjacent the end walls 28, 28'.

Formed within the end wall 29 of said wheel cylinder block W are a pair of spaced-apart compartments 31, 31' for accommodating fluid responsive, reciprocating pistons 32, 32' having an end wall 33, 33' projecting spacedly outwardly of the end wall 29. Each piston 32, 32' is circumferentially surrounded by sealing rings 34, 34' to eliminate leakage of fluid during operation.

Opposite the respective end wall 33, 33', each piston 32, 32' is bored for developing a chamber 35 having a peripheral side wall 36 terminating into an end wall 37 located spacedly inwardly from the piston end wall 33. Slideably received within chamber 35 is a damper poppet 38 comprising a cylindrical body 39 having inner and outer end walls 40, 40'. Said cylindrical body 39 contains an axial bore 41 which extends inwardly from outer end wall 40' to a point spacedly from inner end wall 40; there being a relatively small orifice 42 extending through inner end wall 40 for communicating said axial bore 41 with an exhaust conduit 43. Moreover, said axial bore 41 is in communication through passage 44 to a fluid conduit 45 conveniently connected to a source of fluid (not shown).

Said axial bore 41 is counterbored, as at 46, for accommodating a compression spring 47 having one end bearing against the seat 48 formed by the junction of the counterbore 46 and the axial bore 41. The other end of compression spring 47 projects outwardly of outer end wall 40' for engagement with end wall 37 which is concavedly dished for snugly receiving same.

The end walls 33, 33' of pistons 32, 32' are adapted to engage a pivot bar 49 which is fixed within an opening 50 in the web 51 of a brake shoe 52. Said web 51 is defined by inner and outer curvelinear edges 53, 53', respectively, the outer edge 53' integrally carrying an arcuate flange 54 having a brake lining 55 fixed to the outer face thereof.

Provided in brake web 51 spacedly upwardly and outwardly of pivot bar 49 is an anchor pin 56 having end portions projecting beyond both faces of web 51. Secured to each end portion of the anchor pin 56 is one end of a tension spring, as at 57, the other end of which is secured to end portions of another anchor pin 58 provided in the lug 25. In the preferred embodiment, there are four tensions springs 57 for each brake shoe 52; said tension springs 57 being approximately of 80 pound force for urging the brake shoe 52 inwardly toward said spider plate 21. Thus, the pivot bar 49 of brake shoe 52 normally presents a bias against the pistons 32, 32' which is resisted by the compression spring 47. In brake released position, the tension springs 57 have a greater force than the compression spring 47 so that brake shoe 52 is normally urged away from the brake drum d (FIG. 4). The combined forces of tension springs 57 and compression spring 47 are sufficient to maintain brake shoe 52 in the desired attitude.

In its central portion web 51 is provided with a longitudinal, curvelinear slot 59 having upper and lower arcuate edges 60, 60', which merge into elongate, curvelinear side edges 61, 61'. Mounted to both faces of the web 51 adjacent the region of the slot 59 are inner guide bars 62, 62' and outer guide bars 63, 63'; said guide bars 62, 62', 63, 63', being curvelinear in extent having side walls s following the curvature of side edges 61, 61', respectively, of slot 59. Preferrably, the guide bars 62, 62', 63, 63' are positioned so that the side walls s thereof define a narrower spacing 64, 64', respectively, than that of slot 59 (FIG. 4).

Spacedly inwardly from slot 59 there is mounted to said spider plate 21 an arcuate flange 65 of a friction adjuster bracket F comprising a substantially U-shaped body 66 having a top leg 67, a bottom leg 68 and an inner end web 69; The side portions and outer end of said body 66 being open defining a recess r for receiving the brake web 51. The top and bottom legs 67, 68 are in alignment having side edges 70, 70' and 71, 71', respectively, which taper convergingly outwardly from end web 69. The outer end portion of top and bottom legs 67, 68 are formed with axially aligned notches 72, 72', respectively, which extend inwardly terminating into an arcuate end wall 73, 73'.

Provided for extension through the notches 72, 72' of body 66 and the slot 59 of brake shoe 52 is a shank 74 of an elongate bolt or stop member 75 having an externally threaded portion 76 projecting beyond top leg 67 and a head portion 77 projecting beyond bottom leg 68. Provided surroundingly of shank 74 and engaging the head portion 77 is a Bellvue washer 78 which engages a friction pad 79 for urging same into flush engagement with said bottom leg 68. The threaded portion 76 of shank 74 is received within a nut 80 having a roll pin 81 incorporated therewith and extending into said notch 72. The friction pad 79 is comprised of bi-metallic friction material or a metal dissimilar to said body 66, and is adapted to resist movement of shank 74 upon engagement by the inner and outer guide bars 62, 62', 63, 63'.

The clearance c between the brake lining 55, when new, and the brake drum d is less than the spacings 64, 64' between the shank 74 and the side walls s of inner guide bars 62, 62'. Therefore, when the brakes are applied no engagement of shank 74 is realized. As the brake lining 55 commences to wear, the brake shoe 52 will be required, under normal conditions, to move a further distance in order to engage the brake drum d. Therefore the clearance c between the brake lining 55 and the brake drum d becomes greater, approaching and then exceeding the spacings 64, 64' between the inner guide bars 62, 62' and shank 74, whereupon the side walls s of inner guide bars 62, 62' engage the shank 74, moving same outwardly, against the bias of friction pad 79, until the brake lining 55 engages the brake drum d. Upon return of the brake shoe 52 through the bias of tension springs 57, the side walls s of the outer guide bars 63, 63' abut against shank 74 for precluding further inward movement of the brake shoe 52. The combination of the force of the compression spring 47 urging the pistons 32, 32' outwardly and the frictional force of friction pad 79 are sufficient to resist the return bias of tension springs 57. Thus, no matter how worn the brake lining 55 becomes, the clearance c between the brake lining 55 and the brake drum d will remain substantially the same. Additionally, the stroke of the pistons 32, 32' will be substantially constant since pistons 32, 32' will be called upon to move the brake shoe 52 substantially the same distance at all times. With limited brake fluid capacity, the brake shoe clearance must be maintained relatively static.

As the brake lining 55 decreases in thickness because of wear, the shank 74 moves outwardly. The clearance c between the brake shoe 55 and the brake drum d when the brake is in released condition, may be altered by changing the diameter of the shank 74 or surrounding same with a sleeve 82 of given thickness, as illustrated in FIG. 6.

OPERATION

When the operator of the vehicle incorporating the present invention engages the service brake, fluid is directed through fluid conduit 45, passage 44, bore 41 into the counterbore 46 for impinging against the end wall 37 thereby urging the pistons 32, 32' outwardly. The engagement of the end walls 33, 33' and pivot bar 49 urges the brake shoe 52 outwardly against the bias of tension springs 57 until the brake lining 55 engages the brake drum. As mentioned above, the side walls s of the inner guide bars 62, 62' will not engage shank 74 until the brake lining 55 becomes worn. When this occurs, the inner guide bars 62, 62' engage shank 74 and urges same outwardly against the bias of friction pad 79.

When the service brakes are released, the tension springs 57 urge the brake shoe 52 inwardly with the pistons 32, 32' resisting return movement through the bias of compression springs 47 and the fluid within counterbore 46 is exhausted through orifice 42 and said fluid conduit 45. The outer guide bars 63, 63' engage the shank 74 for maintaining a predetermined clearance c between the brake lining 55 and the brake drum d.

As the brake lining 55 becomes worn through usage, the distance between end wall 37 of the pistons 32, 32' and outer end walls 40 of the damper poppet 38 increases resulting in a circumferential shift in the brake shoe 52 as it is applied. The shifting velocity is controlled by a fluid throttling action developed by the orifice 42, since it limits the rate of fluid displacement from the compartments 31, 31' of one side of the wheel cylinder block W to the related compartments (not shown) on the other side thereof. This fluid throttling action presents possible impact shock from damaging either the pistons 32, 32' or the damper poppet 38.

The longitudinal dimension of the curvelinear slot 59 is of sufficient length to permit brake shoe 52 to move in that direction. The open ended notches 72, 72' in body 66 are provided to take up diametrical wear of the brake lining 55. In this manner, the clearance between the brake lining 55 and the brake drum $d$ will remain substantially the same and the stroke of the pistons 32, 32' will remain relatively constant thereby assuring the efficiency and effectiveness of the service brake operation.

Having thus described my invention, what I claim and desire to obtain by Letters Patent is:

1. In a brake assembly having a brake drum and a brake shoe with a lining, a brake adjustment device comprising:
   a stop member engageable with said brake shoe;
   support means for said stop member comprising a bracket mounted to said brake assembly;
   means associated with said brake shoe for urging said stop member toward said brake drum a distance directly proportional to the wear of said brake lining, upon application of said brake;
   said means associated with said brake shoe including an elongate opening having longitudinal side edges;

said stop member passing through said opening;
   the distance between said longitudinal side edges of said opening being greater than the width of said stop member for establishing a clearance;
   a friction producing member carried by said stop member and engageable with said bracket for resisting return movement of said stop member to maintain a predetermined clearance between the brake shoe lining and said brake drum, upon release of said brake.

2. A brake adjustment device as defined in claim 1 and further characterized by:
   a first guide bar presented adjacent one longitudinal side edge of said opening;
   a second guide bar presented adjacent the other longitudinal side edge of said opening;
   the spacing between said side walls being less than the distance between the longitudinal side edges of said opening;
   each guide bar having a side wall adapted for engaging said stop member;
   the side wall of the guide member nearest the brake drum engaging said stop member upon release of said brake.

3. A brake adjustment device as defined in claim 2 and further characterized by:
   said first and second guide members constituting a first set fixed to one face of said web;
   a second set of guide members fixed on the opposed face of said web;
   each guide member of said second set having a side wall being in alignment with the side wall of the related guide member of the first set.

4. A brake adjustment device as defined in claim 3 and further characterized by:
   means defining a sleeve provided surroundingly of said stop member in the region of said first and second sets of guide members, for reducing the said clearance.

5. In a brake assembly having a brake drum and a brake shoe with a lining, a brake adjustment device comprising:
   a stop member engageable with said brake shoe;
   support means for said stop member;
   means associated with said brake show for urging said stop member toward said brake drum a distance directly proportional to the wear of said brake lining, upon application of the brake;
   means carried by said stop member for resisting return movement of same to maintain a predetermined clearance between the brake shoe lining and said brake drum, upon release of the brake;
   said brake shoe including a web having a longitudinal slot disposed therein;
   said support means comprising a bracket mounted to said brake assembly;
   said bracket having a recess for receiving said brake web, said recess defining upper and lower portions in aligned relationship with said brake web in the region of said longitudinal slot;
   each upper and lower portion having registering openings in alignment with said longitudinal slot;
   said stop member received within said longitudinal slot and having end portions projecting outwardly of said registering openings;
   means moveably engaging the end portions of said stop member to said upper and lower portions of said bracket.

6. A brake adjustment device as defined in claim 5 and further characterized by:
   said means carried by said stop member for resisting return movement of same comprising a friction pad provided surroundingly of said stop member and engaging the adjacent portion of said brakcet.

7. A brake adjustment device as defined in claim 6 and further characterized by:
   said friction pad being fabricated of bimetallic material.

8. A brake adjustment device as defined in claim 6 and further characterized by:
   said bracket being cast of metal;
   said friction pad being fabricated of a metallic material different from said bracket.

9. A brake adjustment device as defined in claim 6 and further characterized by:
   said means moveably mounting said stop member including a resilient member provided surroundingly of said end portion of said stop member, said resilient member biasing said friction pad against the adjacent portion of said bracket.

10. For use with a vehicle service brake assembly incorporating: a brake drum; a brake shoe having a web, a flange and a brake lining carried by said flange; actuator means for urging said brake shoe into engagement with said brake drum; return means for urging the brake shoe away from said brake drum; the improvement comprising:

said brake web having a longitudinal slot;

a bracket mounted to said brake assembly, said bracket having a recess for developing upper and lower legs;

said brake web received within said recess in spaced relationship with said upper and lower legs;

each upper and lower leg having a notch in alignment with said longitudinal slot;

a stop member received within said longitudinal slot having end portions projecting outwardly of said notches;

first and second sets of guide members positioned on opposite faces of said brake web for reinforcing the side edges of said longitudinal slot;

means retaining the end portions of said stop member outwardly of said upper and lower legs;

a friction producing member carried by at least one end portion of said stop member;

resilient means provided on an end portion for urging said friction producing pad into friction producing relationship with the related leg of said bracket.

11. The invention as defined in claim 10 and further characterized by:

the guide members closest to the brake drum normally engaging said stop member upon actuation of said return means;

the opposite guide members engaging said stop member for moving same toward said brake drum in direct proportion to the wear of said brake lining upon energization of said actuator means.

* * * * *